United States Patent [19]
Tabata et al.

[11] Patent Number: 4,567,082
[45] Date of Patent: Jan. 28, 1986

[54] NONREFLECTIVE AND LIMITATIVELY LIGHT-TRANSMITTING BOARD

[75] Inventors: Hiroshi Tabata, Yokohama; Yasuaki Kai, Yokosuka, both of Japan

[73] Assignee: Nissan Motor Co., Ltd., Yokohama, Japan

[21] Appl. No.: 700,112

[22] Filed: Feb. 8, 1985

[30] Foreign Application Priority Data

Feb. 13, 1984 [JP] Japan .................................. 59-22779

[51] Int. Cl.[4] .............................................. B32B 3/24
[52] U.S. Cl. .................................... 428/138; 428/141; 428/409
[58] Field of Search ............... 428/116, 119, 137, 138, 428/141, 142, 409, 410

[56] References Cited

U.S. PATENT DOCUMENTS 4,263,356 4/1981 Nomura et al. ...................... 428/138
4,378,397 3/1983 Sussman .............................. 428/410
4,519,154 5/1985 Molari, Jr. .......................... 428/412

FOREIGN PATENT DOCUMENTS 96817 6/1982 Japan .................................. 428/141

Primary Examiner—William J. Van Balen
Attorney, Agent, or Firm—Schwartz, Jeffery, Schwaab, Mack, Blumenthal & Evans

[57] ABSTRACT

A board suitable for use as a front cover of a vehicle instrument panel. The board consists of a transparent plate and an opaque shade film which is bonded to a major surface of the transparent plate and is formed with a number of substantially uniformly distributed light-transmitting holes. To adequately limit diffusion of light transmitted from the shade film side, the holes are designed such that the ratio of the hole diameter to the hole depth, i.e. shade film thickness, is greater than 0.23 and smaller than 0.5 and that the ratio of the hole diameter to the distance of each hole form every adjacent hole is greater than 1.2 and smaller than 25. The exposed front surface of the transparent plate is finished to a surface roughness of 0.15–0.40 micron so as to become a difusely reflective surface to thereby prevent undesirable reflection of extraneous light such as sunlight from this surface. The holed shade film is usually formed by using a photosensitive resin and is preferably matte-finished at least in its inner surfaces defining the respective light-transmitting holes.

7 Claims, 3 Drawing Figures

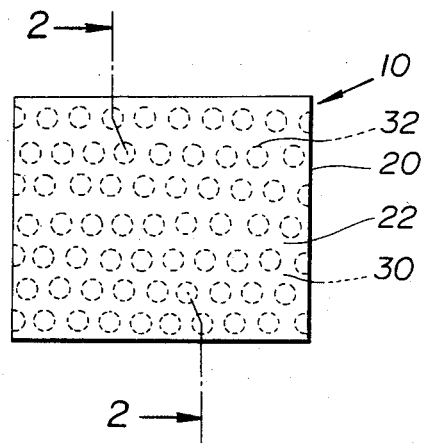
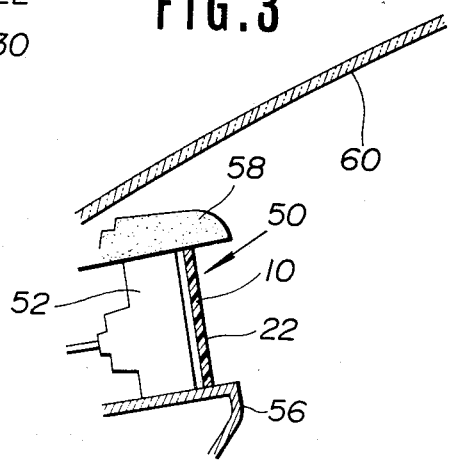
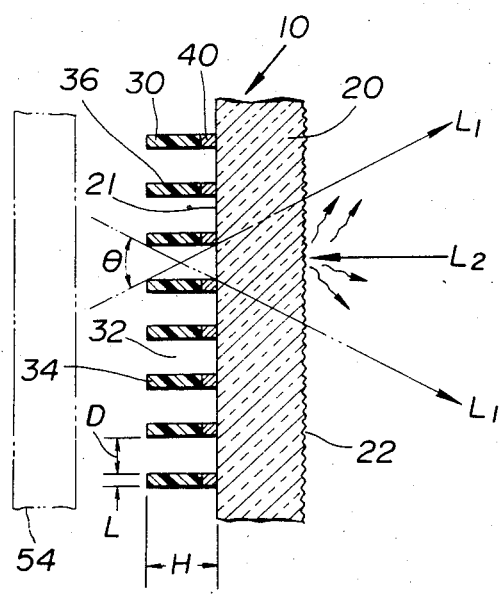

NONREFLECTIVE AND LIMITATIVELY LIGHT-TRANSMITTING BOARD

BACKGROUND OF THE INVENTION

This invention relates to a practically nonreflective and limitatively light-transmitting board which is particularly suitable for use as a front cover of a vehicle instrument panel.

In automobile instrument panels, for example, a front cover plate installed in front of the meters or display panels must be transparent enough to allow the driver to clearly read the meters or displays by natural light. For good readability through the cover plate, reflection of intense extraneous light from the cover plate and reflection of any equipment of the driver or passenger compartment on the cover plate are undesirable. Furthermore, while the meters or displays are illuminated or are emitting light as is usual at night, diffusion of light from the instrument panel into a side window is obstructive to the driver's looksee at a door mirror, for example.

It is conceivable to provide the transparent cover plate with an antireflective and anti-interferential coating film. In theory it is possible to produce an effective antireflective and anti-interferential coating film with respect to light of specific wavelengths within a narrow range. In practice, however, it is very difficult to fully accomplish the object with respect to natural light which is very wide in the range of wavelengths.

SUMMARY OF THE INVENTION

It is an object of the present invention to provide a practically nonreflective and limitatively light-transmitting board, which is particularly suitable for use as a front cover of a vehicle instrument panel and which provides good visibility therethrough without allowing wide diffusion of light transmitted therethrough from the side opposite to the viewer.

A board according to the invention comprises a transparent plate having a front major surface which is finished to a surface roughness in the range from 0.15 to 0.40 μm so as to become a diffusely reflective surface, and an opaque shade film which is bonded to the back major surface of the transparent plate and is formed with a number of substantially uniformly distributed light-transmitting holes. In this board, the light-transmitting holes may be either circular or polygonal in cross-sectional shape, and the ratio of the diameter, or the diameter of the inscribed circle, of the holes to the depth of the holes is greater than 0.23 and smaller than 0.5, while the ratio of the hole diameter to the distance of each hole from every adjacent hole is greater than 1.2 and smaller than 25.

When used in a vehicle instrument panel, the board according to the invention is placed in front of the meters or display panels with the diffusely reflective surface of the transparent plate on the outer side facing the driver. The light-transmitting holes in the shade plate provide sufficient visibility through this board to the driver. The adequately rough-finished front surface of the transparent plate has the effect of practically suppressing reflection of intense extraneous light such as sunlight or light from headlights of other cars from this surface without impeding readability of the meters or displays through the board. The limitations on the ratio of the hole diameter to the hole depth, i.e. shade film thickness, and the ratio of the hole diameter to the distance between two holes respectively within the above specified ranges have the effect of directing light from the meters or displays toward the driver and inhibiting free diffusion of the same light into unwanted regions. That is, during night travelling the instrument panel cover board according to the invention prevents images of the meters or displays from reflecting in the side windows.

The holed shade film can be formed by curing a film of a photosensitive resin on the transparent plate with a suitably patterned mask placed on the resin film. The shade film may include an adhesive film interposed between the transparent plate and the photosensitive resin film. In that case, the light-transmitting holes extend through the entire thickness of the adhesive film.

Preferably, the shade film inner surfaces defining the respective light-transmitting holes are matte-finished because reflection of light from these surfaces might produce ghost images.

BRIEF DESCRIPTION OF THE DRAWING

FIG. 1 is a schematic plan view of a nonreflective and limitatively transmitting board according to the invention;

FIG. 2 is an explanatorily enlarged sectional view of the board of FIG. 1 taken along the line 2—2 in FIG. 1; and FIG. 3 is an explanatory and sectional view of an automobile instrument panel using the board of FIGS. 1 and 2.

DESCRIPTION OF THE PREFERRED EMBODIMENTS

FIGS. 1 and 2 show the construction of a nonreflective and limitatively transmitting board 10 according to the invention. The board 10 consists of a solid and transparent plate 20 and an opaque shade film 30 which is bonded to a smooth major surface 21 of the plate 20 with an adhesive 40. The opposite surface 22 of the transparent plate 20 is adequately roughened so as to become a diffusely reflective surface. The laminate of the shade film 30 and the adhesive film 40 is formed with a large number of through-holes 32 which are substantially uniformly distributed over the entire area of the laminate, so that the surface 21 of the transparent plate 20 is exposed in substantially uniformly distributed small circular areas.

Referring to FIG. 3, the board 10 of FIGS. 1 and 2 is particularly suitable for use as the front cover of an automobile instrument panel 50. The cover board 10 is installed in front of the measurement and display instruments 52 with the diffusely reflective surface 22 of the transparent plate 20 on the outer side. As usual, the instruments 52 and the cover board 10 are supported by a lower cover member 56 and an upper pad 58. Numeral 60 indicates a windshield of the car. In FIG. 2, numeral 54 indicates an illuminated or light-emitting display panel in the instrument panel 50. The board 10 is placed such that the shade film 30 faces the display panel 54 and is suitably spaced therefrom.

Usually, the material of the transparent plate 20 is a synthetic resin such as a methacrylic resin or a polycarbonate resin. If desired, a transparent glass plate may alternatively be used. The transparent plate 20 may be colorless. However, it is preferable to use a suitably colored and transparent plate considering that readability of the display becomes best when the absorption wavelengths of the transparent plate 20 are nearly overlapping with the wavelength range of light from the display panel 54. Depending on the color of light emitted from the display panel 54, very good readability of the display can be attained by coloring the transparent plate 20 in the manner as shown in Table 1.

TABLE 1

| Color or Light | Absorption Wavelengths of Transparent plate |
|---|---|
| green | peaking at 540–560 nm |
| blue | peaking at 480–510 nm |
| yellow | peaking at 560–580 nm |
| red | peaking at 620–650 nm |

The material of the shade film 30 is a conventional photosensitive resin which may be of either a solid type or a liquid type. A preferred example of the solid type resins is a so-called photosensitive nylon, i.e. polyamide base photosensitive resin. A preferred example of the liquid type resins is an unsaturated polyester base photosensitive resin. A preferred example of the adhesive 40 is a modified acrylate base adhesive that can be cured by ultraviolet rays. The holes 32 in the shade film 30 and the underlying adhesive film 40 are formed by using a patterned mask in curing the photosensitive resin and adhesive on the plate 20 by irradiation of actinic light. After curing and holing, the shade film 30 is dyed opaquely. The holes 32 provide light-transmitting regions of the board 10, and the unholed portions of the shade film 30 and adhesive 40 become light intercepting regions 34 of the board 10.

The holes 32 have a predetermined diameter D and a predetermined depth H, which coincides with the total thickness of the shade film 30 and the adhesive film 40 when the adhesive film 40 is opaque, but with the thickness of the shade film 30 if the adhesive film 40 is transparent. The distances between any two adjacent holes 32 take an approximately constant value L. In the present invention, the shade film 30 is formed and holed such that the ratio of the hole diameter to the hole depth, D/H, is greater than 0.23 and smaller than 0.5, and that the ratio of the hole diameter to the distance between two holes, D/L, is greater than 1.2 and smaller than 25. It should be noted that the cross-sectional shape of the holes 32 is not necessarily circular and may alternatively be square or regular hexagonal, or still different polygonal. In such cases, the inscribed circle diameter in the polygon is taken as the diameter D in the aforementioned ratios D/H and D/L.

By limiting the ratios D/H and D/L respectively within the above specified ranges, it is possible to prevent light emitted from the display panel 54 from diffusing into the driver's field of vision when the driver looks at a door mirror through a side window. The basis for the specified range of the diameter to depth ratio, D/H, is our finding that the board 10 possesses desirable characteristics when the diffusion angle $\theta$ indicated in FIG. 2 with respect to light $L_1$ from the display panel 54 is smaller than 54° and greater than 24°. As can be seen, the diffusion angle $\theta$ is twice the possible maximum angle of incidence of light $L_1$ on the plate surface 21. If the diffusion angle $\theta$ is greater than 54°, reflection of light $L_1$ in the side windows becomes probable. To make $\theta < 54°$, it is necessary that D/H < 0.5. If the diffusion angle $\theta$ is smaller than 24°, readability of the display panel 54 in its corner regions will become unsatisfactory. To make 24° < $\theta$, it is necessary that 0.23 < D/H.

With respect to light $L_1$ from the display panel 54, the shield rate of the holed shade film 30 can be adjusted within the range from 9 to 87% by suitably determining the diffusion angle $\theta$, hole diameter D, hole depth H and distance L between two holes. At angle of incidence $\phi = \frac{1}{2}\theta$, the shield rate $\eta_\phi(\%)$ is given by the following equations.

$$\eta_\phi = (1 - T_\phi/T_0) \times 100(\%)$$

where $T_0$ is transmissivity when $\phi$ is 0°, and $T_{100}$ is transmissivity at $\phi$.

$$T_0 = \frac{\pi}{2\sqrt{3}} \left( \frac{D}{D+L} \right)^2 \times 100(\%)$$

$$T_\phi = S/S_0 \times T_0 \times 100(\%)$$

where $S_0$ is the cross-sectional area of each light-transmitting region 32 having the diameter D, and S represents an effective area of the same region 32 on the transparent plate surface 21 excluding the shaded area.

$$S_0 = \pi D^2/4$$
$$S = 4(I - \alpha\beta)$$

$$I = \frac{D^2}{8} \left\{ \sin\frac{2\alpha}{D} + \frac{2\alpha}{D} \sqrt{1 - \left(\frac{2\alpha}{D}\right)^2} \right\} \cos\phi$$

$$\alpha = \left\{ \frac{D^2}{4} - \left(\frac{H}{2}\tan\phi\right)^2 \right\}^{\frac{1}{2}}$$

$$\beta = \frac{H}{2}\sin\phi$$

Preferably, the cylindrical inner surfaces 36 of the holed shade film 30 are matte-finished. When the inner surfaces 36 are smooth and reflective, reflection of light $L_1$ from these surfaces 36 will produce ghost images and will blur display on the display panel 54. The inner surfaces 36 may be matted after forming the holes 32, and/or a matting agent may be added to the photosensitive resin employed as the material of the shade film 30. In the latter case, it is suitable to limit the amount of the matting agent to a maximum of about 6 wt% of the photosensitive resin because the use of a larger amount of matting agent might cause lowering of the toughness of the photo-cured shade film 30.

If the cured resin film 30 is transparent, it does not serve the shading or screening purpose even though the holes 32 are formed in appropriate dimensions and arrangement. Therefore, the cured resin film 30 needs to be rendered opaque by a dyeing treatment using a dye which has good affinity for the cured photosensitive resin but does not have affinity for the material of the transparent plate 20. The dyeing treatment may be carried out by an immersion method, vacuum dyeing method or showering method. Preferably, a matting agent is added to the dye to render the cylindrical inner surfaces 36 of the shade film 30 opaque as well as the outer surface in the light-intercepting regions 34.

Before forming the shade film 30, the front surface 22 of the transparent plate 20 is processed by a known method into an adequately rough and diffusely reflective surface. It is important to control the surface roughness of this surface 22 within the range from 0.15 to 0.40 micron. By so controlling the surface roughness it is possible to practically suppress the reflection of extraneous light $L_2$ from the surface 22 without significantly impeding readability of display on the display panel 54. In an experiment wherein each sample board 10 was placed at a distance of 1.5 cm from the display panel 54, the surface roughness of the transparent plate surface 22 affected the readability of display through the board 10 and the regular reflectivity of the plate 20 as shown in Table 2. The transparent plate 20 was a polymethyl methacrylate resin plate, which was colorless and exhibited a reflectivity of 93% for visible light when smooth-finished.

TABLE 2

| Surface Roughness ($\mu$m) | Readability of Display | Regular Reflectivity (%) (angle of incidence 5°) |
|---|---|---|
| 0.10 | very clearly readable | 6.2 |
| 0.15 | clearly readable | 3.8 |
| 0.20 | ibid | 3.5 |
| 0.30 | ibid | 2.1 |
| 0.40 | slightly blurred | 1.3 |
| 0.45 | obscured as if seeing through ground glass plate | 0.7 |

As represented by the above experimental results, when the surface roughness is below 0.15 micron the plate surface 22 is still considerably reflective so that undesirable phenomena such as regular reflection of intense extraneous light $L_2$, which may be sunlight or light from head lights of other cars, and reflection of some equipments in the driver or passenger compartment on the plate surface 22 are still probable. On the other hand, when the surface roughness is above 0.40 micron it becomes difficult to clearly read the display through the board 10 though regulator reflection of extraneous light $L_2$ is fully suppressed.

EXAMPLE 1

A polymethyl methacrylate resin plate was used as the transparent plate 20. The plate 20 was colored in bluish gray so that the transmissivity peaked at 510 nm. A surface of the transparent plate 20 was processed by a conventional rough-finish process into the diffusely reflective surface 22 having a surface roughness of 0.20 $\mu$m.

Onto the opposite surface 21 of the transparent plate 20, a modified acrylate base adhesive capable of being cured by ultraviolet rays was applied by a doctor blade method to a thickness of about 10 $\mu$m. Next, an about 0.5 mm thick film of a solid type photosensitive nylon resin was laid on the uncured adhesive film by means of a laminater. The outer surface of the photosensitive resin film was lightly covered with talc powder, and then the talc powder was wiped away. After that, a negative type working mask was placed on the photosensitive resin film. This mask had a number of circular nontransmitting regions which had a diameter of 500 $\mu$m and were uniformly distributed at a distance of 50 $\mu$m from every adjacent region. By a vacuum degassing operation it was ensured that no air layer remained between the photosensitive resin film and the working mask. Then, the photosensitive resin and the underlying adhesive were simultaneously cured by irradiation of light from an ultra-high pressure mercury lamp. The dose of irradiation was 12.6 mW/cm$^2$, and the duration of irradiation was 60 sec. The photographic density of the used mask was not lower than 4 to prevent transmission of light in the unwanted regions, and parallel rays were used for the exposure to thereby minimize sideways scattering of light into the unexposed regions. Next, development was performed by applying 30° C. water at a pressure of 5.7 kg/cm$^2$ for about 200 sec, until complete removal of the uncured portions of the photosensitive resin and adhesive. By this process, the smooth surface 21 of the transparent plate 20 was coated with the adhesive film 40 and the shade film 30 in which the holes 32 were arranged in the intended manner. The cured and holed shade film 30 was washed with water and dried.

Next, the shade film 30 was rendered opaque by a dyeing process which comprised immersion of the nearly finished board 10 in a polyurethane base black ink added with 8 wt% of carbon black and 6 wt% of a matting agent, heating of the ink-treated board at 40° C., washing by showering water and drying. At this stage, supplementary exposure to low intensity ultraviolet rays or humidification may optionally be performed.

In the nonreflective and limitatively transmitting board 10 finished by the dyeing process: the hole diameter D was 0.27 mm, the hole depth H was 0.6 mm and the distance L between two holes 32 were 0.05 mm.

EXAMPLE 2

The transparent plate 20 was of the same material as the one used in Example 1, and the plate surface 22 was finished to a surface roughness of 0.20 $\mu$m.

The opposite surface 21 of the transparent plate 20 was coated with a thin layer of a modified acrylate base adhesive capable of being cured by ultraviolet rays. Then, a liquid type photosensitive resin, which was an unsaturated polyester base resin, was gently poured on the uncured adhesive film so as to uniformly spread over the entire area without incorporating air bubbles until the thickness of the liquid resin layer reached 0.45 mm. Then, a Myler film was carefully spread over the liquid resin layer so as to make a close contact with the resin surface without trapping air therebetween. After that, a negative type working mask was placed on the Myler film, and curing of the photosensitive resin and the underlying adhesive was carried out by the same method and under the same conditions as in Example 1 except that the duration of irradiation of ultraviolet light was shortened to 45 sec. Next, development was performed by applying 3% aqueous solution of sodium borate, which was preheated to 30° C. and pressurized to 5.2 kg/cm$^2$, until complete removal of the uncured portions of the photosensitive resin and adhesive.

Finally, the shade film 30 was rendered opaque and matte-finished by immersion of the nearly finished board 10 in a polyurethane base black ink added with 10 wt% of carbon black and 6 wt% of a matting agent, followed by heating at 40° C., washing with water and drying.

EVALUATION TESTS

The boards 10 of Examples 1 and 2 were evaluated by the following tests. First, antireflective performance was examined by a usual test method. Next, transmissibility or visibility through the board 10 was examined by placing each board 10 at a distance of 1.5 cm from a paperboard on which characters of various sizes were indicated. Finally, diffusion controlling performance was evaluated by substituting an illuminating device for the aforementioned paperboard to examine the directivity of light emitted by the illuminating device and passed through the board 10.

By these tests both of the boards 10 of Examples 1 and 2 were confirmed to be satisfactory in the antireflective performance, visibility through each board and directivity of light transmitted through each board from the shade film side.

COMPARATIVE EXAMPLES

For comparison, six kinds of light-transmitting board samples not in accordance with the invention were produced by modifying the manufacturing process of Example 1 only in the following points, respectively.

SAMPLE A

The rough-finishing treatment of the surface 22 of the transparent and bluish gray plate 20 and the dyeing of the shade film 30 were omitted.

SAMPLE B

The transparent plate 20 was colorless, and the rough-finishing treatment of the plate surface 22 and the dyeing of the shade film 30 were omitted.

SAMPLE C

The rough-finishing treatment of the surface 22 of the transparent and bluish gray plate 20 was omitted, and no matting agent was added to the black ink for dyeing the shade film 30.

SAMPLE D

The transparent plate 20 was colorless, and the rough-finishing treatment of the plate surface 22 and the addition of the matting agent to the black ink for dyeing the shade film 30 were omitted.

SAMPLE E

The rough-finishing treatment of the surface 22 of the transparent and bluish gray plate 20 was omitted.

SAMPLE F

The transparent plate 20 was colorless, and the rough-finishing treatment of the plate surface 22 was omitted.

These Samples A–F too were subjected to the above described evaluation tests. The Samples A–F were all inferior and unsatisfactory in the antireflective performance. Furthermore, the Samples A and B were inferior in the directivity of the transmitted light so that the light diffused into considerably widely expanding regions. The Samples C and D were a little inferior in the visibility to the boards 10 of Examples 1 and 2.

What is claimed is:

1. A nonreflective and limitatively light-transmitting board suitable for use as a front cover of a vehicle instrument panel, the board comprising:
    a transparent plate having a front major surface which is finished to a surface roughness in the range from 0.15 to 0.40 μm so as to become a diffusely reflective surface; and
    an opaque shade film which is bonded to the back major surface of said transparent plate and is formed with a number of substantially uniformly distributed light-transmitting holes which are circular or polygonal in cross-sectional shape, the ratio of the diameter, or the diameter of the inscribed circle, of said holes to the depth of said holes being greater than 0.23 and smaller than 0.5, the ratio of said diameter to the distance of each of said holes from every adjacent one of said holes being greater than 1.2 and smaller than 25.

2. A board according to claim 1, wherein said shade film is matte-finished at least in its inner surfaces respectively defining said light-transmitting holes.

3. A board according to claim 1, wherein the material of said transparent plate is a synthetic resin.

4. A board according to claim 3, wherein said transparent plate is colored.

5. A board according to claim 1 wherein said shade film comprises a film of a cured photosensitive resin.

6. A board according to claim 5, wherein said shade film consists of an outer film of said cured photosensitive resin and a film of a cured photosensitive adhesive which interposes between said outer film and said back major surface of said transparent plate, said holes being formed through said outer film and said film of said adhesive.

7. A board according to claim 5, wherein said shade film is dyed and matte-finished in its outer surface and in its inner surfaces respectively defining said light-transmitting holes.

* * * * *